US009132748B2

(12) United States Patent
Park

(10) Patent No.: US 9,132,748 B2
(45) Date of Patent: Sep. 15, 2015

(54) SEAT BACK MOUNTING STRUCTURE OF VEHICLE BODY

(71) Applicant: Hyundai Motor Company, Seoul (KR)

(72) Inventor: Hyeong Gyu Park, Bucheon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 6 days.

(21) Appl. No.: 14/099,746

(22) Filed: Dec. 6, 2013

(65) Prior Publication Data

US 2015/0076889 A1 Mar. 19, 2015

(30) Foreign Application Priority Data

Sep. 16, 2013 (KR) ........................ 10-2013-0111100

(51) Int. Cl.
*A47C 7/02* (2006.01)
*B60N 2/015* (2006.01)

(52) U.S. Cl.
CPC ..................................... *B60N 2/015* (2013.01)

(58) Field of Classification Search
CPC .................................. B60N 2/015; B60N 2/36
USPC .......................................... 297/463.1, 452.18
See application file for complete search history.

(56) References Cited

U.S. PATENT DOCUMENTS 5,685,612 A * 11/1997 MacDonald et al. ...... 297/378.1
5,700,058 A * 12/1997 Balagurumurthy et al. ...................... 297/463.1 X
5,803,549 A * 9/1998 Bolsworth et al. ......... 297/463.1
7,581,793 B2 * 9/2009 Hartmann et al. ......... 297/463.1
8,678,496 B2 * 3/2014 Zorine ................... 297/463.1 X
8,720,847 B2 * 5/2014 Reimann .................... 248/503.1
2010/0133882 A1 * 6/2010 Hantsch et al. ........ 297/463.1 X
2012/0205959 A1 * 8/2012 Pacolt ........................ 297/463.1
2013/0009444 A1 * 1/2013 Wilson et al. ............. 297/463.1
2013/0341951 A1 * 12/2013 Asai et al. ....................... 296/63
2015/0115687 A1 * 4/2015 Funaki et al. ............. 297/463.1

FOREIGN PATENT DOCUMENTS

JP 11-342778 A 12/1999
JP 2003-40003 A 2/2003
JP 2012-136087 A 7/2012
KR 2000-0021451 U 12/2000
KR 10-0534938 B1 12/2005

* cited by examiner

*Primary Examiner* — Rodney B White
(74) *Attorney, Agent, or Firm* — Morgan, Lewis & Bockius LLP

(57) ABSTRACT

A seat back mounting structure of a vehicle body may include a side pin that is fixed on a seat back frame, a seat back bracket formed with an insertion hole through which the side pin is inserted, a fixation hole, and a guide route between the insertion hole and the fixation hole such that the side pin moves from the insertion hole to the fixation hole, and an elastic bracket including a fixation portion formed at one side thereof, the fixation portion being fixed on the seat back bracket, and a protruded portion formed at a central portion of the elastic bracket, the protruded portion reducing a width of the guide route and elastically deformed by the side pin when the side pin moves from the insertion hole to the fixation hole.

12 Claims, 4 Drawing Sheets

120
130
110
100
170
160
150
140
110
330a
330b
130
320
120
320
170
300
100
310

SEAT BACK MOUNTING STRUCTURE OF VEHICLE BODY

CROSS-REFERENCE TO RELATED APPLICATION

The present application claims priority of Korean Patent Application Number 10-2013-0111100 filed on Sep. 16, 2013, the entire contents of which application are incorporated herein for all purposes by this reference.

BACKGROUND OF INVENTION

1. Field of Invention

The present invention is related to a seat back mounting structure of a vehicle body that improves assembly stability during mounting a seat on a vehicle body and improves driving stability after the assembly in such a way that reduces cost and productivity.

2. Description of Related Art

Generally, when a vehicle collides, recognition for a passenger safety is increased, therefore a demand for increasing strength of a seat back is increased so as to reduce damage that is caused by an object of a trunk and a luggage load test is performed to test the strength of a side mounting part and a seat of the seat back.

There is a tendency that a hinge bracket being applied to a central part and a side part of a rear seat is severely deformed during the test and the tendency can affect the safety of the passenger. Also, when a seat back is assembled through a side hinge bracket and a center hinge bracket of the hinge bracket, an operator has to lift a seat and try to match a bolt assemble hole, and therefore the operation is discomfort and the stability can be deteriorated.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a seat back mounting structure of a vehicle body having advantages of improving assembly stability during mounting a seat on a vehicle body and driving stability after the assembly in such a way that reduces cost and productivity.

A seat back mounting structure of a vehicle body according to various aspects of the present invention may include a side pin that is fixed on a seat back frame, a seat back bracket formed with an insertion hole through which the side pin is inserted, a fixation hole, and a guide route between the insertion hole and the fixation hole such that the side pin moves from the insertion hole to the fixation hole, and an elastic bracket including a fixation portion formed at one side thereof, the fixation portion being fixed on the seat back bracket, and a protruded portion formed at a central portion of the elastic bracket, the protruded portion reducing a width of the guide route and elastically deformed by the side pin when the side pin moves from the insertion hole to the fixation hole.

The seat back mounting structure may further include a reinforcement plate, one side of which is fixed on the protruded portion of the elastic bracket and the other side of which is fixed on the seat back bracket.

The side pin may include a pin head at an end thereof with a larger diameter, and the interior diameter of the insertion hole may be larger than the interior diameter of the pin head. The interior diameter of the fixation hole may be substantially equal to the exterior diameter of the side pin. The interior diameter of the guide route may become gradually smaller from the insertion hole to the fixation hole.

A first burring portion and a second burring portion may be respectively formed on an interior side of the guide route and the fixation hole, and they are plastically deformed by the side pin, when they are engaged with the side pin.

The protruded portion of the elastic bracket may prevent the side pin from being separated from the fixation hole through the guide route.

A middle portion of the guide route that is formed between the insertion hole and the fixation hole may be bent by a predetermined angle, and the protruded portion of the elastic bracket may be disposed on the bent portion thereof to reduce the interior diameter of the guide route. The protruded portion may have a convex shape that is convex toward a central side of the guide route.

One surface of each end portion of the elastic bracket may be welded on one side of the seat back bracket, one surface of the protruded portion may be welded on one surface of one side of the reinforcement plate, and one surface of the other side of the reinforcement plate may be welded on one surface of the seat back bracket. The reinforcement plate may have a predetermined thickness and a predetermined shape to transmit a predetermined elastic force to the protruded portion. The insertion hole may be formed at an upper side of a central portion of the seat back bracket.

As described above, in a seat back mounting structure of a vehicle body according to various aspects of the present invention, a guide route is formed from an insertion hole to a fixation hole of a seat back bracket, a protruded portion of an elastic bracket that is disposed on the guide route is elastically deformed by a side pin to enable the movement of the side pin, and after the side pin is mounted, the protruded portion prevents the side pin from being separated from the fixation hole to improve the stability.

Further, a reinforcement plate that is fixed on an inner side of the seat back bracket elastically supports the protruded portion of the elastic bracket in such a way that the protruded portion effectively prevents the separation of the side pin.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
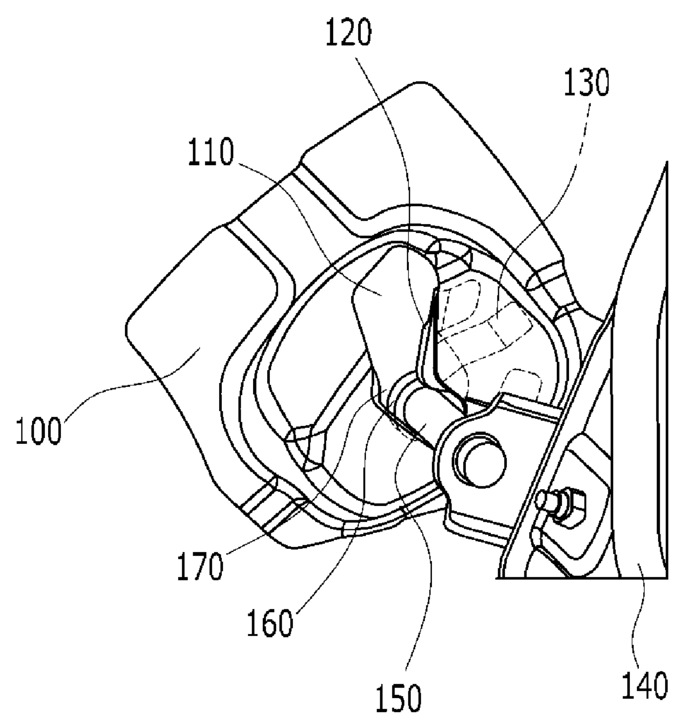
FIG. 1 is a partial perspective view showing a condition that a seat is assembled on an exemplary seat back mounting structure of a vehicle body according to the present invention.
Figure 2:
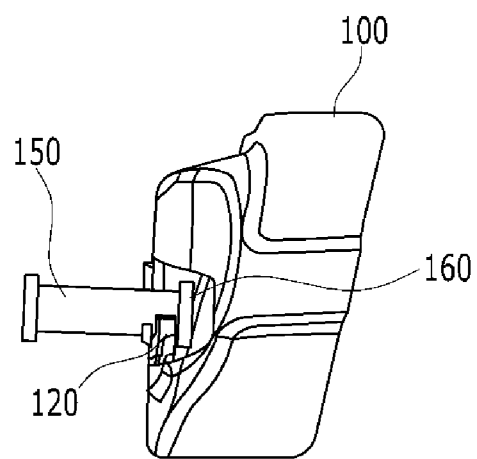
FIG. 2 is a partial rear side view showing a condition that a seat is assembled on an exemplary seat back mounting structure of a vehicle body according to the present invention.

FIG. 1 is a partial perspective view showing a condition that a seat is assembled on a seat back mounting structure of a vehicle body, and FIG. 2 is a partial rear side view showing a condition that a seat is assembled on a seat back mounting structure of a vehicle body according to various embodiments of the present invention. Referring to FIG. 1 and FIG. 2, a seat back mounting structure of a vehicle body includes a seat back bracket 100, an elastic bracket 120, a reinforcement plate 130, a seat back frame 140, and a side pin 150. An insertion hole 110 and a guide route 170 are formed on the seat back bracket 100 and a pin head 160 is formed at an end portion of the side pin 150.

The side pin 150 is fixed on one side of the seat back frame 140, while the side pin 150 moves from an upper side to a lower side, the side pin 150 is inserted into the insertion hole 110, and the side pin 150 moves along the guide route 170 to be fixed on the seat back bracket 100. The seat back bracket 100 maintains a condition that is fixed on vehicle body.

Figure 3:
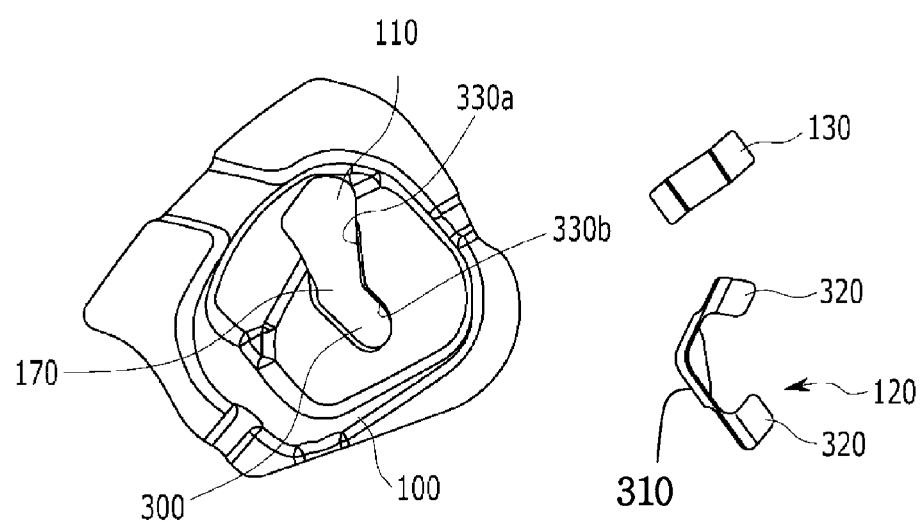
FIG. 3 is a partial exploded perspective view of an exemplary seat back mounting structure of a vehicle body according to the present invention.

FIG. 3 is a partial exploded perspective view of a mounting structure of a mounting structure according to various embodiments of the present invention. Referring to FIG. 3, an insertion hole 110 is formed at an upper side of a central portion of the seat back bracket 100, and a fixation hole 300 is formed at a lower side. And, a guide route 170 is formed to connect the insertion hole 110 with the fixation hole 300. The guide route 170 is formed from an upper side to a lower side and the middle portion of the guide route 170 is bent by a predetermined angle.

The side pine 150 that is inserted into the insertion hole 110 moves downward along the guide route 170 to be fixed on the fixation hole 300. Further, a first burring portion 330*a* and a second burring portion 330*b* are respectively formed at an inner side of the guide route 170 and the fixation hole 300. The first burring portion 330*a* and the second burring portion 330*b* reduce the friction noise that can be formed by the side pin 150 and is plastically deformed by the side pin 150 in such a way that side pin 150 is securely fixed while they are engaged with the side pin 150.

A protruded portion 310 is formed at a central portion of the elastic bracket 120, and a fixation portion 320 is formed at both sides thereof. The protruded portion 310 of the elastic bracket 120 protrudes toward a central side of the guide route 170 in such a way that a width or diameter of the guide route 170 of the seat back bracket 100 is reduced. For a structure that is not circular, diameter herein refers to a characteristic diameter of the structure.

Figure 4:
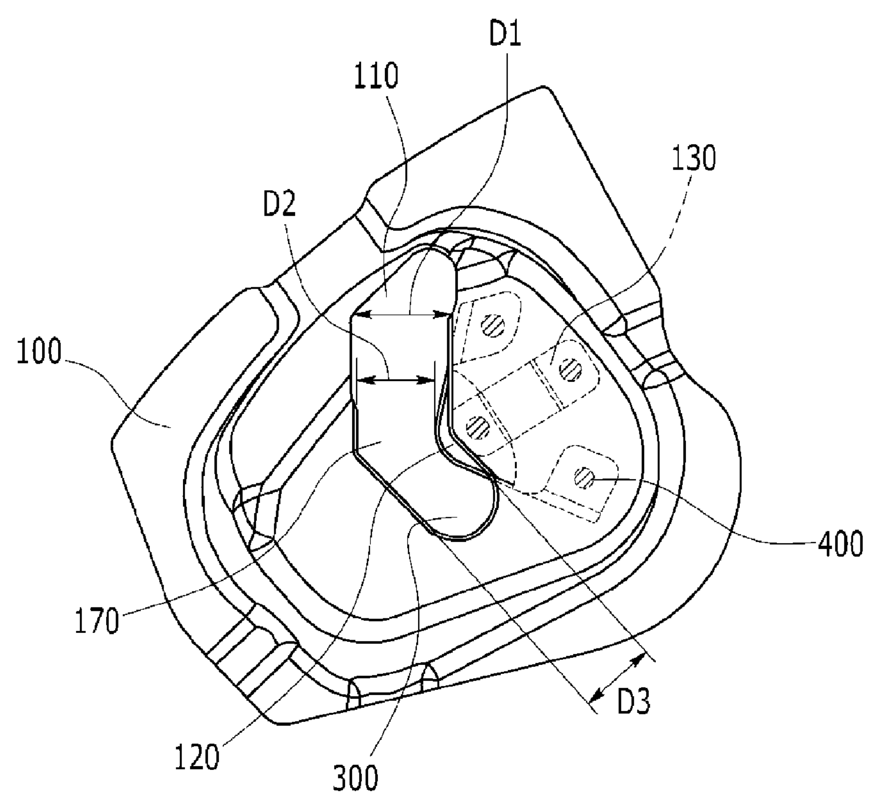
FIG. 4 is a partial perspective view of an exemplary seat back mounting structure of a vehicle body according to the present invention.

The fixation portion 320 is welded or fixed to an inner side surface of the seat back bracket 100 to form a welding portion (400, FIG. 4). And, the reinforcement plate 130 is welded or fixed to one side of the protruded portion 310 and one side of the reinforcement plate 130 is bent.

The protruded portion 310 is elastically transformed by the side pin 150 while the side pin 150 moves downward along the guide route 170, and if the side pin 150 moves to the fixation hole 300, the protruded portion 310 returns its original position in such a way that a width or diameter of the guide route 170 is reduced. The reinforcement plate 130 elastically fixes the protruded portion 310 of the elastic bracket 120.

FIG. 4 is a partial perspective view of a seat back mounting structure of a vehicle body according to various embodiments of the present invention. Referring to FIG. 4, an insertion hole 110, a guide route 170, and a fixation hole 300 are formed on the seat back bracket 100, and the protruded portion 310 of the elastic bracket 120 is formed at the bent portion of the guide route 170 in such a way that the width or diameter of the guide route 170 is reduced.

As shown in the drawings, a first width or diameter of the insertion hole 110 has D1, a second width or diameter of the guide route 170 that the protruded portion 310 of the elastic bracket 120 is disposed has D2, and a third width or diameter of the fixation hole 300 has D3. In various embodiments, the second width or diameter D2<the third width or diameter D3<the first width or diameter D1. And, when the side pin 150 moves along the guide route 170, the second width or diameter D2 associated with the protruded portion 310 of the elastic bracket 120 is instantly increased and returned to its original width or diameter again.

In some embodiments of the present invention, the diameter of the side pin can be 20 mm and the second width or diameter D2 can be 16 mm. And, the interior diameter of the insertion hole can be 30 mm, the interior diameter of the fixation hole can be 20 mm, and the exterior diameter of the pin head can be 26 mm.

The protruded portion 310 has a convex structure that is convex toward a central side of the guide route 170 in such a way that the side pin 150 smoothly moves to be mounted.

Further, the insertion hole 110 is formed at an upper side, the fixation hole 300 is formed at a lower side, the guide route 170 is formed from the insertion hole 110 to the fixation hole 300 in a lower direction, and the width or diameter of the guide route 170 becomes gradually smaller from an upper side to a lower side. Further, the interior diameter of the insertion hole 110 is larger than the exterior diameter of the pin head 160 of the side pin 150, and the interior diameter of the fixation hole 300 can be equal to the exterior diameter of the side pin 150.

In some embodiments of the present invention, the guide route 170 is formed from the insertion hole 110 of the seat back bracket 100 to the fixation hole 300, the protruded portion 310 of the elastic bracket 120 that is disposed on the guide route 170 is elastically deformed when the side pin 150 moves along the guide route 170 to enable the movement of the side pin 150, and after the guide pin is fixed in the fixation hole 300, the protruded portion 310 prevents the side pin 150 from being separated from the fixation hole 300 to improve the stability.

Further, the reinforcement plate 130 that is fixed on an inner side of the seat back bracket 100 elastically supports the protruded portion 310 of the elastic bracket 120 in such a way that the protruded portion 310 prevents the separation of the side pin 150 from the fixation hole 300.

For convenience in explanation and accurate definition in the appended claims, the terms "upper" or "lower", "interior" or "exterior", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A seat back mounting structure of a vehicle body, comprising:

a side pin that is fixed on a seat back frame;

a seat back bracket formed with an insertion hole through which the side pin is inserted, a fixation hole, and a guide route between the insertion hole and the fixation hole such that the side pin moves from the insertion hole to the fixation hole; and an elastic bracket including a fixation portion formed at one side thereof, the fixation portion being fixed on the seat back bracket, and a protruded portion formed at a central portion of the elastic bracket, the protruded portion reducing a width of the guide route and elastically deformed by contacting the side pin when the side pin moves from the insertion hole to the fixation hole.

2. The seat back mounting structure of the vehicle body of claim 1, further comprising a reinforcement plate, one side of which is fixed on the protruded portion of the elastic bracket and the other side of which is fixed on the seat back bracket.

3. The seat back mounting structure of the vehicle body of claim 2, wherein one surface of each end portion of the elastic bracket is welded on one side of the seat back bracket, one surface of the protruded portion is welded on one surface of one side of the reinforcement plate, and one surface of the other side of the reinforcement plate is welded on one surface of the seat back bracket.

4. The seat back mounting structure of the vehicle body of claim 2, wherein the reinforcement plate has a predetermined thickness and a predetermined shape to transmit a predetermined elastic force to the protruded portion.

5. The seat back mounting structure of the vehicle body of claim 1, wherein the side pin includes a pin head at an end thereof with a larger diameter, and an interior diameter of the insertion hole is larger than an interior diameter of the pin head.

6. The seat back mounting structure of the vehicle body of claim 5, wherein an interior diameter of the fixation hole is substantially equal to an exterior diameter of the side pin.

7. The seat back mounting structure of the vehicle body of claim 6, wherein an interior diameter of the guide route becomes gradually smaller from the insertion hole to the fixation hole.

8. The seat back mounting structure of the vehicle body of claim 6, wherein a first burring portion and a second burring portion are respectively formed on an interior side of the guide route and the fixation hole, and they are plastically deformed by the side pin when they are engaged with the side pin.

9. The seat back mounting structure of the vehicle body of claim 1, wherein the protruded portion of the elastic bracket prevents the side pin from being separated from the fixation hole through the guide route.

10. The seat back mounting structure of the vehicle body of claim 1, wherein a middle portion of the guide route that is formed between the insertion hole and the fixation hole is bent by a predetermined angle, and the protruded portion of the elastic bracket is disposed on the bent portion thereof to reduce an interior diameter of the guide route.

11. The seat back mounting structure of the vehicle body of claim 10, wherein the protruded portion has a convex shape that is convex toward a central side of the guide route.

12. The seat back mounting structure of the vehicle body of claim 1, wherein the insertion hole is formed at an upper side of a central portion of the seat back bracket.

* * * * *